United States Patent [19]

Edahiro et al.

[11] Patent Number: 5,170,384
[45] Date of Patent: Dec. 8, 1992

[54] TRACKING CONTROL FOR OPTICAL INFORMATION RECORDING AND REPRODUCING APPARATUS

[75] Inventors: Yasuaki Edahiro; Noboru Kikuchi, both of Hirakata; Akira Kurahashi, Yawata, all of Japan

[73] Assignee: Matsushita Electric Industrial Co., Ltd., Osaka, Japan

[21] Appl. No.: 475,943

[22] Filed: Feb. 6, 1990

[30] Foreign Application Priority Data

Feb. 7, 1989 [JP] Japan .................... 1-128203

[51] Int. Cl.$^5$ ............................... G11B 7/00
[52] U.S. Cl. .................. 369/44.28; 369/44.32; 369/44.35; 369/44.41
[58] Field of Search .............. 358/907; 369/32, 44.25, 369/44.28, 44.29, 44.32, 44.35, 44.41; 360/78.01, 78.04

[56] References Cited

U.S. PATENT DOCUMENTS 4,057,832 11/1977 Kappert .............. 369/44.28 X
4,539,664 9/1985 Deguchi et al. ........... 369/44.28 X
4,541,083 9/1985 Maeda et al. ............. 369/44.28

FOREIGN PATENT DOCUMENTS 62-200534 9/1987 Japan .

Primary Examiner—Robert L. Richardson
Attorney, Agent, or Firm—Wenderoth, Lind & Ponack

[57] ABSTRACT

A tracking control apparatus of an optical signal recording/reproduction apparatus, records and reproduces a data signal by causing a light spot focused on an optical recording medium to trace data-recording tracks and then accesses the light spot to a desired track. The tracking control apparatus varies a tracking-servo target value in a direction of performing the track-jumping operation, and then, if the tracking error signal exceeds a predetermined position level, the tracking control apparatus repeatedly varies the polarity of the tracking error signal until the light spot eventually arrives at the target track subject to the track-jumping operation. By virtue of the structure mentioned above, the tracking control apparatus can stably perform the track-jumping operation even when external disturbances, such as vibration, occur in the servo system.

9 Claims, 16 Drawing Sheets

TRACKING CONTROL FOR OPTICAL INFORMATION RECORDING AND REPRODUCING APPARATUS

BACKGROUND OF THE INVENTION

1. Field of the Invention

The present invention relates to an optical data recording/reproduction apparatus which optically records signal on a recording medium by applying a light source, such as a laser beam, and reproduces the recorded signal. More particularly, the invention relates to a tracking control apparatus which causes light spot focused on the recording medium to trace a signal track and to jump to a predetermined track.

2. Description of the Prior Art

There are conventional optical data recording/reproduction apparatus which focus and irradiate a light beam generated from a light source, such as a semiconductor laser, on a recording medium of a disc rotating for a predetermined number of rotations before eventually recording and reproducing data signals. The recording medium is provided with a large number of data recording/reproduction tracks each having a 1.2 micron width and 1.6 micron pitch in a spiral or concentrically circular form. In order to record a signal on the tracks or reproduce a signal recorded on the tracks, these optical recording/reproduction apparatus execute a focussing control operation to focus a light beam on the recording medium in order that an extremely fine light spot having a maximum diameter of 1 micron can be generated, while the optical recording/reproduction apparatus also executes a tracking control operation so that the extremely fine light spot can correctly trace the center of the signal-recording track.

Normally, these conventional tracking control apparatus are composed of the following: a photodetector which detects the tracking-deviated signal by applying the reflected light of a light beam subjected to the influence of diffraction in the signal recording/reproduction track or by applying light which has permeated the recording/reproduction medium; a circuit means which provides the detected tracking signal with phase-compensation, and an actuator which drives an objective lens or a galvano mirror in order to transfer the light spot in a direction which is almost 90°— apart from the signal track. Each 5.25-inch optical disc has about 18,000 tracks. In order to record and reproduce signals on and from the desired track, the optical disc recording/reproduction apparatus transfers the light spot in a direction which is almost 90°— apart from the signal recording/reproduction tracks before accessing the desired track. The transfer of the light spot between signal recording/reproduction tracks on the disc is called a "track-jumping" operation.

As was typically disclosed in the Japanese Laid-Open Patent Publication No. 62-200534 of 1984, any conventional optical data recording/reproduction apparatus discontinues the tracking control operation before driving the tracking actuator in the desired direction by applying a pulse signal. As soon as the tracking actuator arrives at the halfway position on the way to the desired track, the conventional system drives the tracking actuator in the opposite direction, and then as soon as the tracking actuator arrives at the desired track, the system resumes the tracking control operation by performing the track-jumping. In other words, since the conventional system discontinues the tracking control operation to perform the tracking jumping by applying pulse signal for driving the tracking actuator, the conventional system cannot fully stand external disturbances, such as vibration, incurred by the servo system while the track-jumping operation is underway, thus unavoidably resulting in an unstable track-jumping operation.

SUMMARY OF THE INVENTION

An object of the invention is to fully solve the above problem by providing novel tracking control apparatus which can stably fulfil the track-jumping operation.

To achieve the above object, a tracking control apparatus of an optical signal recording/reproduction system embodied by the present invention comprises: an optical head for emitting a light beam to from a light spot on an optical recording medium on which a plurality of information tracks have been formed and for detecting a reflected light beam from the optical recording medium;

a tracking error detecting means for detecting from the reflected light beam a deviation of the light spot from an information track and for outputting a tracking error signal indicative of said deviation;

a reference signal generating means for generating first and second reference signals which have respective predetermined constant levels opposite in polarity from each other;

a first comparing means for comparing a level of said tracking error signal with said first reference signal and for outputting a first comparison signal indicative of a comparison result thereof;

a second comparing means for comparing a level of said tracking error signal with aid second reference signal and for outputting a second comparison signal indicative of a comparison result thereof;

a tracking target position signal generating means for generating a tracking target position signal indicative of a tracking target position in which the light spot is to be positioned;

a polarity inverting means for inverting a polarity of said tracking error signal;

a subtracting means for subtracting said tracking target position signal from an output signal of said polarity inverting means;

a phase compensating means for compensating a phase of an output signal of said subtracting means to obtain a tracking control signal;

a drive means responsive to said tracking control signal for driving said optical head so as to move the light spot to the tracking target position; and a control means for controlling said tracking target position signal generating means to change said tracking target position signal and being responsive to said first and second comparison signals for controlling said polarity inverting means to perform such a polarity inversion control that inverts the polarity of said tracking error single when an absolute value of the level of said tracking error signal has exceeded an absolute value of the level of said first reference signal and restores the polarity of said tracking error signal when an absolute value of the level of said tracking error signal has exceeded an absolute value of the level of said second reference signal;

wherein said control means first controls said tracking target position signal generating means to change said tracking target position signal to indicate a position shifted in a direction crossing the information tracks from said tracking target position, and then controls said polarity inverting means means to perform the polarity inversion control until the light spot reaches a position on a predetermined target information track, and thereafter controls said target position signal generating means to restore said tracking target position signal to indicate said tracking target position to thereby perform a track-jump operation in which the light spot is moved from an information track to the target information track in the direction crossing the information tracks.

The tracking control apparatus featuring the above structure constantly follows up the track control operation even when the track-jumping operation is underway,m and yet, even if external disturbance, such as vibration, occur to the servo system, the tracking control apparatus generates the driving force capable of suppressing the external disturbance so that it can stably perform the track-jumping.

DESCRIPTION OF THE PREFERRED EMBODIMENTS

Figure 1:
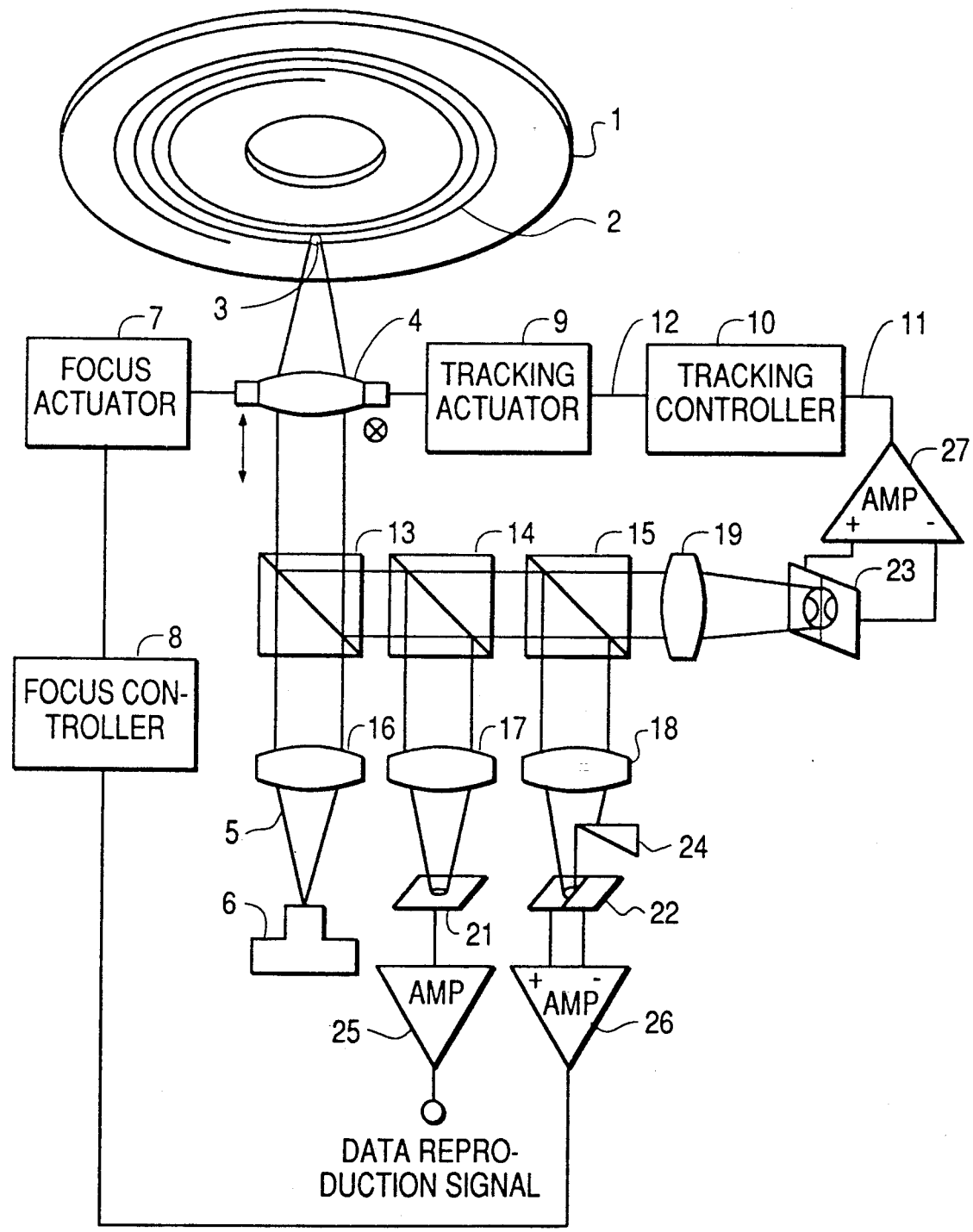
FIG. 1 is a schematic block diagram of an optical signal recording/reproduction apparatus.

As shown in FIG. 1, an optical disc 1 stored in the optical data recording/reproduction apparatus is provided with a large number of data recording/reproduction tracks 2.

A light beam 5 emitted from a laser diode 6 is initially converted into parallel beams by a collimator lens 16. The parallel beams then permeate a half mirror 13 and an objective lens 14, which are then focused into an extremely fine light spot 3 before eventually being irradiated on the optical disc 1. The light reflected by the optical disc 1 permeates an objective lens 4, where part of the light is reflected by the half mirror 13 and turns itself by 90°— before being split into two parts by a half mirror 14. One of the split light beams reflected by the half mirror 14 then permeates a coupling lens f17, which is then converted into an electrical data reproduction signal by a photodetector 21 and a data reproduction amplifier 25. The other light beam reflected by the half mirror 14 is split into two parts by a half mirror 15. One of the split light beams then permeates a coupling lens 18, while part of the beam is stopped by a knife wedge 24 and then enters into a divided photodetector 22. Finally, a differential amplifier 26 detects an electrical focus error signal. A focus controller 8 then compensates for the phase of the focus error signal before generating a focus driving signal. Based on the focus driving signal, a focus actuator 7 moves the objective lens 4 in a direction which is almost perpendicular to the surface of the medium of the optical disc 1 in order to execute focus control to correctly fit the focus of the light beam 5 on the surface of the recording medium of the optical disc 1. the other split light reflected by the half mirror 15 permeates a coupling lens 19 and then enters a divided photodetector 23, which is finally converted into an electrical tracking error signal 11 by a differential amplifier 27. A tracking control apparatus 10 compensates for the phase of the tracking error signal 11 and then generates a tracking drive signal 12. Based on the tacking drive signal 12, a tracking actuator 9 moves the objective lens 4 in a direction almost 90°— apart from the data recording/reproduction tracks 2 in order to execute the tracking servo operation to allow the light spot 3 to trace the data recording/reproduction tracks 2 or execute the track-jumping operation to cause the light beam 3 to move across the tracks.

Figure 2:
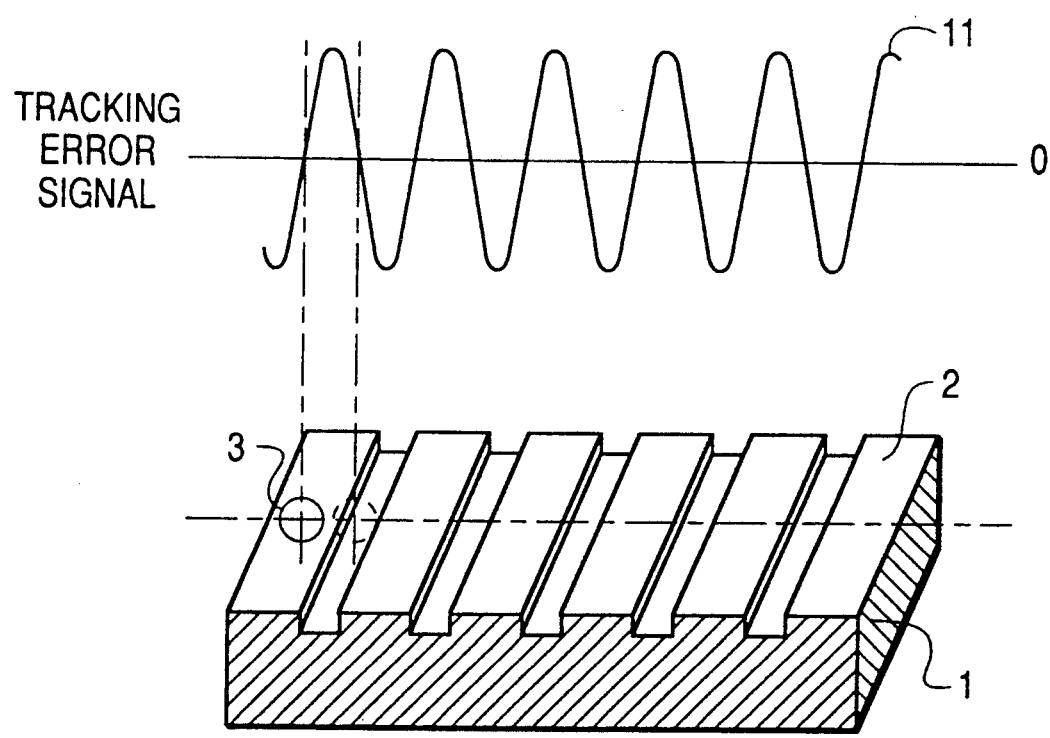
FIG. 2 is a signal waveform chart showing the relationship between the position of light spot on the data recording/reproduction track of the optical disc and the tracking error signal.

FIG. 2 is the signal waveform chart showing the relationship between the position of the light beam 3 on the data recording/reproduction tracks 2 of the optical disc 1 and the tracking error signal 11. The tracking error signal 11 is substantially of a sine wave shape which becomes 0 when the light spot 3 at the center of the data recording/reproduction track 2 and at the center of the groove between adjoining data recording-/reproduction tracks 2. The tracking target position signal is substantially the target value when the light spot 3 traces the data recording/reproduction tracks 2. In other words, the tracking target position signal is substantially the value designating the position to be traced by the light spot 3 across the surface of the data recording/reproduction tracks 2. When the tracking target position is off from 0, in response to it, the light spot 3 traces the position off from the center of the data recording/reproduction tracks 2. Normally, the tracking target position is set to 0 which is substantially the value of the center of the data recording/reproduction track 2.

Figure 3:
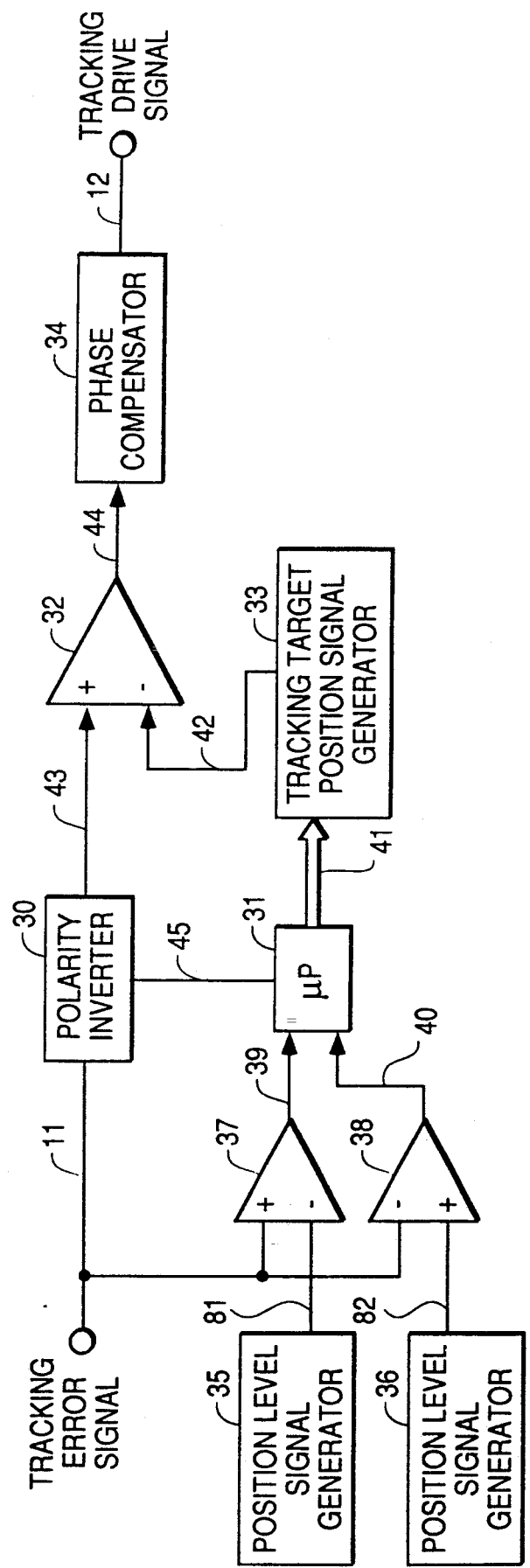
FIG. 3 is a schematic bloc diagram of a tracking control apparatus in accordance with the first embodiment of the present invention incorporating a microprocessor.

FIG. 3 is a schematic block diagram of a tracking control apparatus using a microprocessor in accordance with a first embodiment of the present invention. A position level signal generator 35 shown in FIG. 3 generates a position level signal 81. A comparator 37 compares the level of the tracking error signal 11 with the position level signal 81 and then outputs a timing signal 39. A position level signal generator 36 generates a position level signal 82. A comparator 38 compares the levels of the tracking error signal 11 with the position level signal 82 and then outputs a timing signal 40. A microprocessor 31 outputs a polarity control signal 45 in response to the timing signals 39 and 40. Acting on the polarity control signal 45, a polarity inverter 30 inverts the polarity of the tracking error signal 11. In response to the tracking target value control signal 41 output from the microprocessor 31, a tracking target position signal generator 33 outputs a tracking target position signal 42. A subtractor 32 subtracts the tracking target position signal 42 from a signal 43 output from the polarity inverter 30 and then outputs a tracking control signal 44. A phase compensator 34 compensates for the phase of the tracking control signal 44 and then outputs a tracking drive signal 12.

Figure 4:
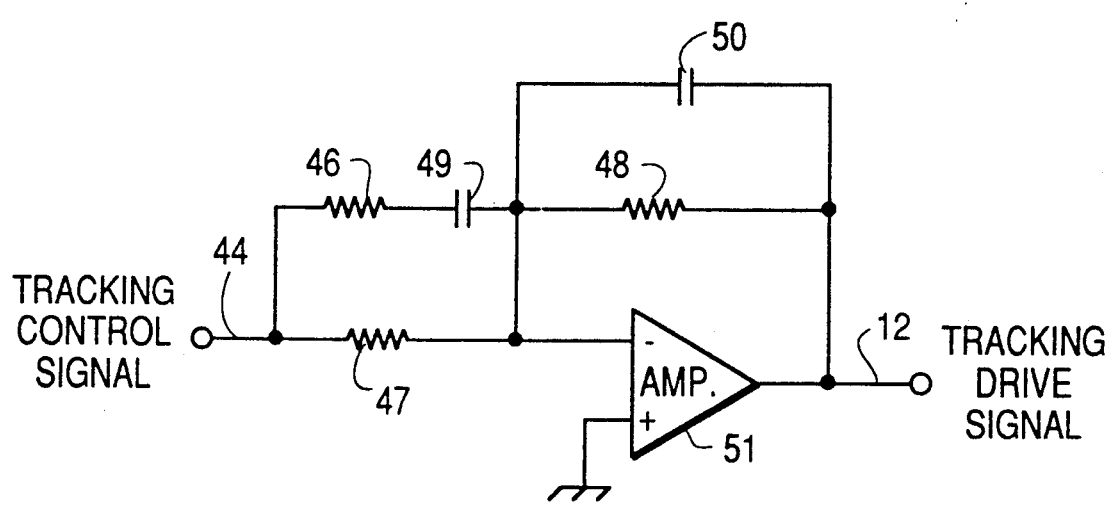
FIG. 4 is a concrete embodiment of the circuit of the phase compensator.

FIG. 4 is a concrete embodiment of the phase compensator 34. Elements 46 through 48 shown in FIG. 4 are resistors; elements 49 and 50 are capacitors, and element 51 is an operation amplifier. This is an example of an analog phase compensation circuit composed of resistors, capacitors, and an operation amplifier. The typical frequency characteristic of this phase-compensation circuit is shown by means of line 91 appearing in FIG. 19.

The phase-compensation circuit may also be composed of a digital circuit or a digital filter made of a digital signal processor (DSP). The present invention does not confine the structure of the phase compensation circuit merely to the on shown in the description of the preferred embodiments.

Figure 5:
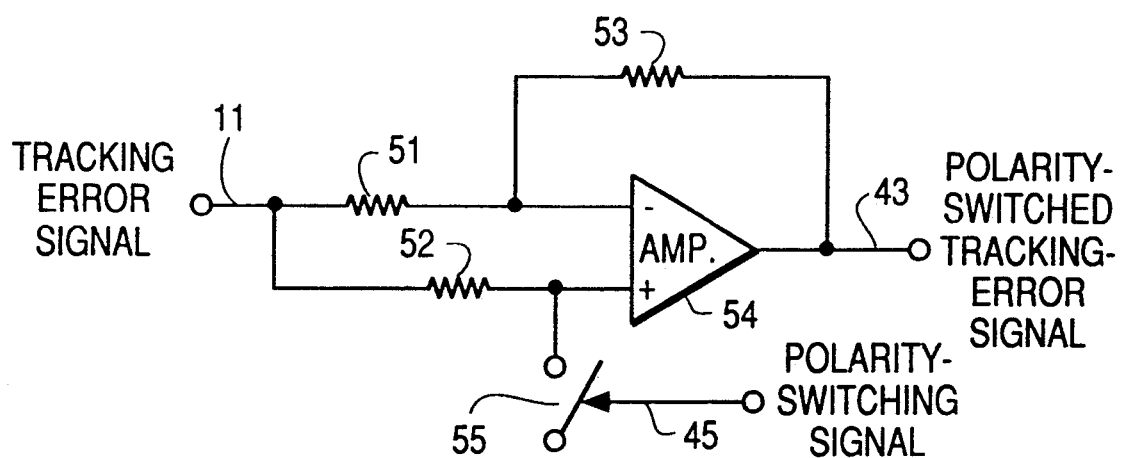
FIG. 5 is a concrete embodiment of the circuit of the polarity inverter.

FIG. 5 is a concrete embodiment of the polarity inverter. Elements 51 through 53 shown in FIG. 5 are resistors; element 54 is an operation amplifier, and element 55 is an analog switch. This is an example of an analog polarity inverter composed of resistors, an operation amplifier, and an analog switch. As soon as the analog switch 55 is connected acting on the instruction of the polarity switching signal 45, the signal 43 output from the polarity inverter 30 turns into the inverted signal of the tracking error signal 11. As soon as the analog switch 55 is disconnected, the signal 43 from the polarity inverter 30 turns into the same polarity as that of the tracking error signal 11.

The polarity inverter may also be composed of a digital circuit or such a digital circuit made of a digital signal processor (DSP). The present invention does not confine the structure of the polarity inverter merely to the one shown in the description of the preferred embodiments.

Figure 6:
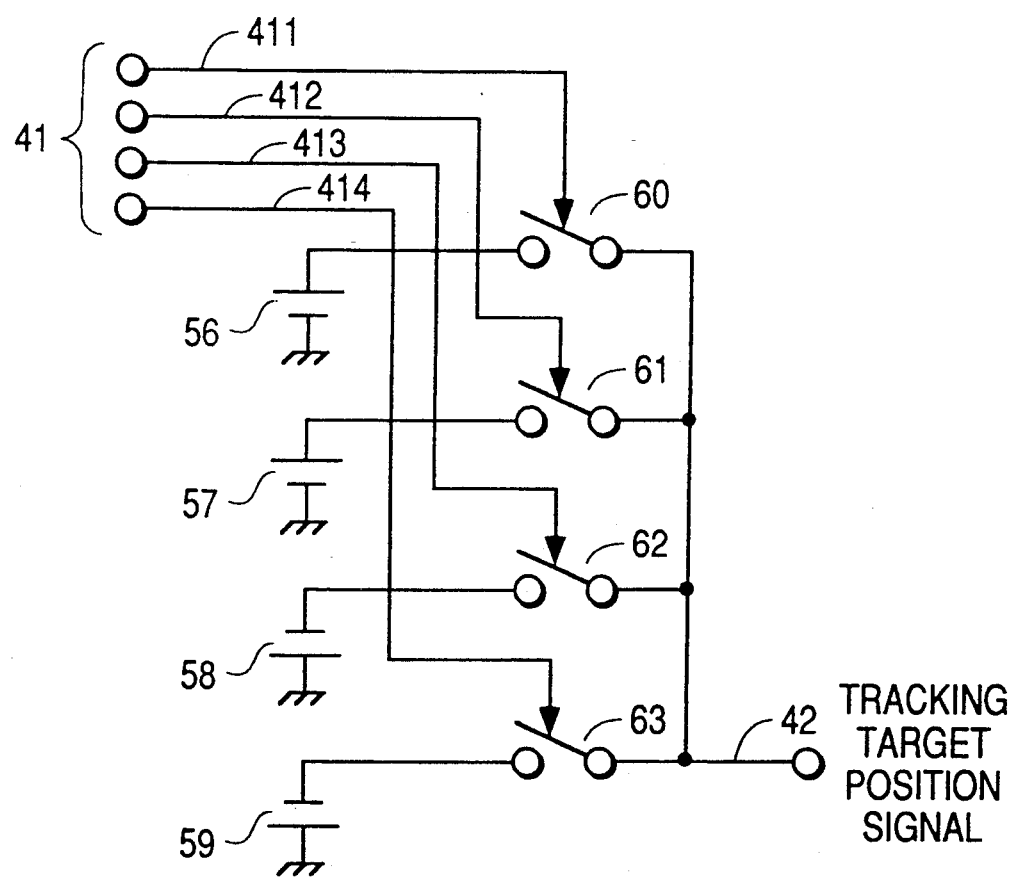
FIG. 6 is a concrete embodiment of the circuit of the tracking target position signal generator.

FIG. 6 is a concrete example of the tracking target position signal generator. Elements 56 through 59 and 60 through 63 are respectively constant voltage sources and analog switches. This is an example of an analog tracking target position signal generator composed of a plurality of voltage sources and analog switches. The first embodiment uses the tracking target position control signal 41 which deals with four signals 411 through 414. Th tracking target position signal generator 33 selects one of these signals and connects the corresponding switch in order to select one of the constant voltage-sources 56 through 59 before it eventually outputs the tracking target position signal 42.

The tracking target position signal generator may also be composed of a digital-to-analog (D/A) converter, or a digital circuit, or a digital signal processor (DSP). The present invention does not confine the number of the tracking target position signal generator merely to the one mentioned in the description of the preferred embodiments.

Figure 7:
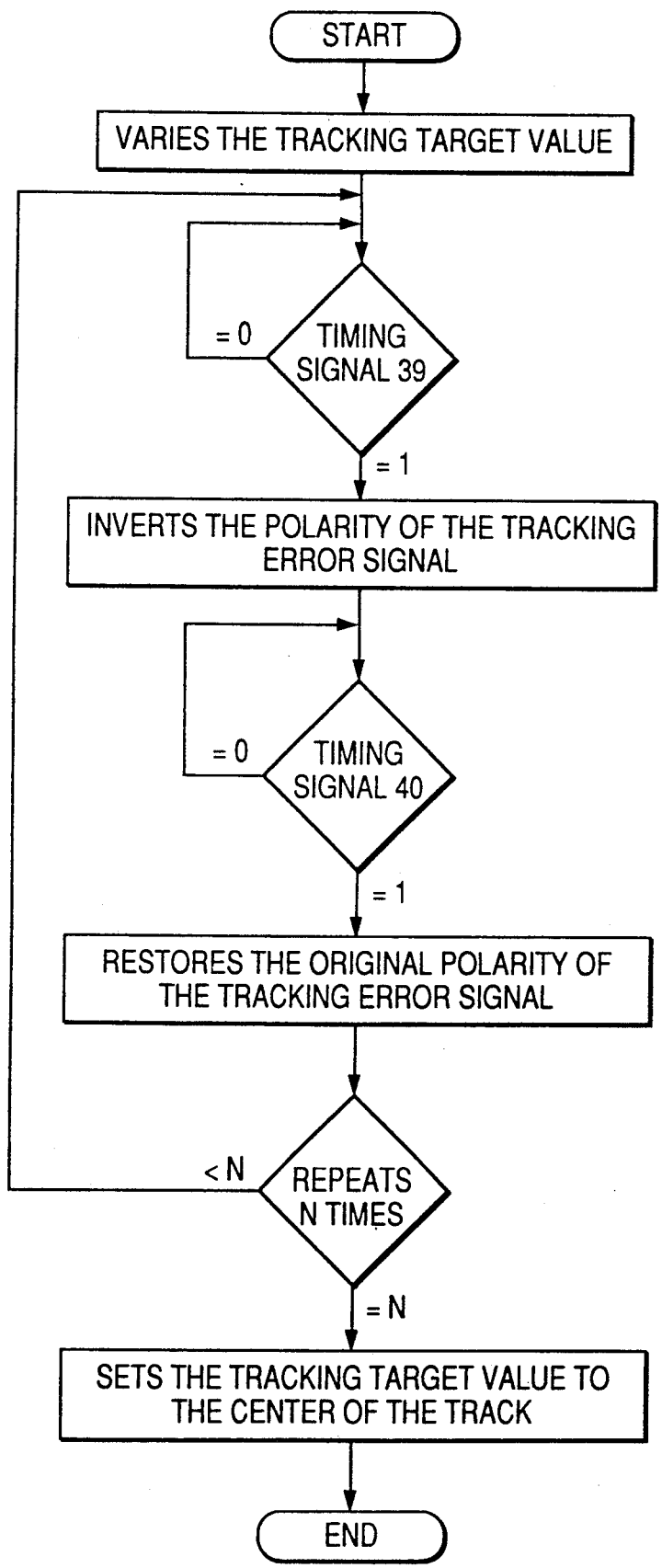
FIG. 7 is a flowchart designating the functional operation of the microprocessor used in the first embodiment of the present invention.
Figure 8:
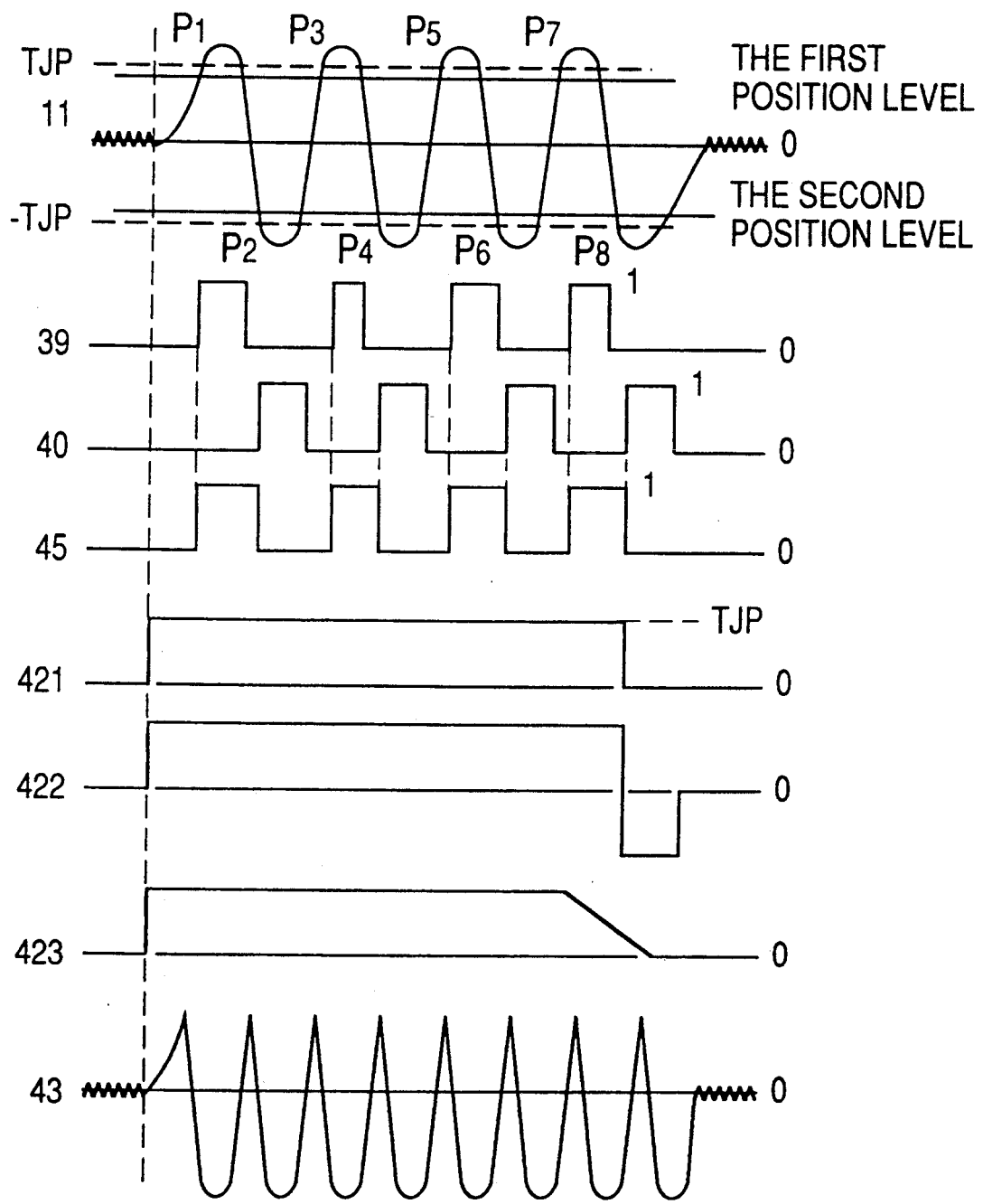
FIG. 8 is a signal waveform chart showing waveforms in various locations of the tracking control apparatus in accordance with the first embodiment of the present invention.

Referring now more particularly to FIGS. 7 and 8, the functional operation of the tracking control apparatus in accordance with the first embodiment of the present invention featuring the above structure is described below. FIG. 7 is a flowchart designating the data processing operation of the microprocessor used in accordance with the first embodiment of the present invention. FIG. 8 illustrates the signal waveforms in various locations of the tracking control apparatus in accordance with the first embodiment of the present invention. Assume that the location of the target data recording/reproduction track as the destination of the transfer of light spot is still far away by N-tracks. In other words, the number of the data recording/reproduction tracks subject to the track-jumping is N. Based on this assumption, the functional operation of the tracking control apparatus when causing the light spot to jump across tracks N=4, i.e. across four tracks in the positive direction, is described below. First, the tracking control apparatus performs the tracking servo operation to cause the light spot to move on along the center of the data recording/reproduction tracks. While this condition is present, the tracking target position signal is at the center position level of the track, in other words, almost at the point 0. First, the microprocessor 31 outputs an instruction to the tracking target position signal generator 33 in order to transfer the tracking target position signal 42 to the position TJP in the direction of performing the jumping as indicated by the line 421 of FIG. 8. This causes the light spot to move itself in the direction of the position Pl. Next, as soon as the tracking error signal 11 exceeds the first position level signal 81, in other words, as soon as the microprocessor 31 detects that the timing signal 39 has varied itself from 0 to 1, the microprocessor 31 outputs an instruction tot he polarity inverter 30 to restore the original polarity of the tracking error signal 11. Then, the light spot moves to the position P3. By repeatedly executing these sequential processes, the light spot sequentially moves to the positions P4, P5, P6, P7, and to P8. As soon as the microprocessor 31 detects that the tracking error signal 11 is smaller than the second position level signal 82, concretely, when the microprocessor 31 detects four times that the timing signal 40 has varied from 0 to 1, i.e., by the rounds of the performed track-jumping, the microprocessor 31 instructs the polarity inverter to restore the original polarity of the tracking error signal 11. The microprocessor 31 then instructs the tracking target position signal generator 33 to bring the tracking target position signal 42 back to the value of the center of the track, i.e., back to 0. The tracking control apparatus embodied by the invention allows the light spot to smoothly perform the jumping to the target track while continuously controlling the tracking operation by executing those sequential processes mentioned above, for example, across four tracks in the first embodiment, thus making it possible for the tracking control apparatus of the present invention to continuously and stably perform the track-jumping operation without adversely being affected by an external disturbance, such as vibration, for example.

The above description has merely referenced to the track-jumping across four tracks. However, the tracking control apparatus reflecting the above embodiment can stably perform the track-jumping operation across any desired number of tracks by executing those sequential processes mentioned above by the number of track-jumps needed.

It is also possible for the tracking control apparatus embodied by the present invention to perform the track-jumping operation in the opposite direction by initially inverting the polarity of the tracking target position signal and by replacing the timing signal 39 with the other timing signal 40.

Figure 9:
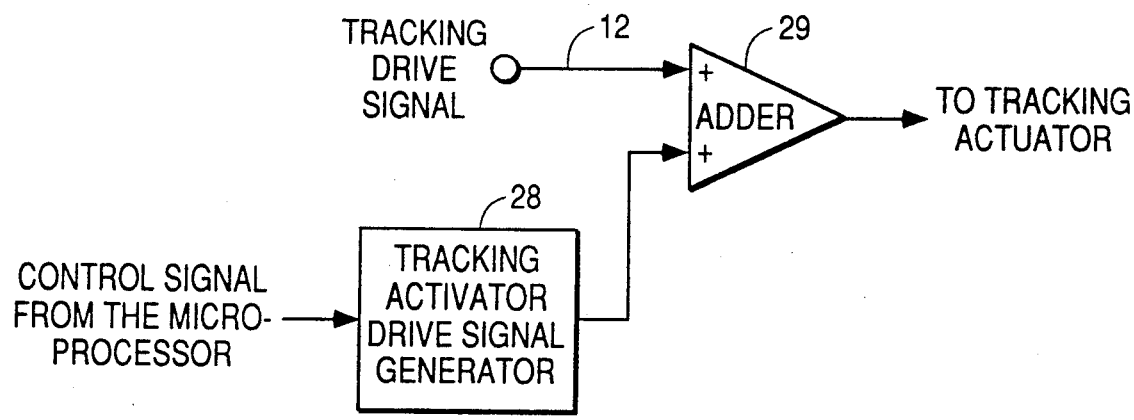
FIG. 9 is an example of circuit of means for adding optical signal to the tracking drive signal.

The tracking control apparatus embodied by the present invention can stabilize the termination of the track-jumping operation by restraining excessive movement of the tracking actuator. This can be done by implementing those sequential process mentioned below. As shown in FIG. 9, first, the microprocessor 31 instructs a tracking actuator drive signal generator 28, and then causes an adder 29 to add a brake signal (which drives the tracking actuator in the direction opposite from the track-jumping direction) to the tracking drive signal 12 until a predetermined period of time elapses or until the tracking error signal 11 reaches the predetermined position level after completing the track-jumping operation. The tracking actuator derive signal generator 28 has a structure quite similar to that of the tracking target position signal generator 33 shown in FIG. 6.

The tracking control apparatus embodied by the present invention can smoothly terminate the track-jumping operation by implementing the flooding processes. While allowing the microprocessor 31 to control the tracking target position signal generator 33, as shown by the line 422, the tracking control apparatus inverts the tracking target position signal 42 until a predetermined period of time elapses or until the tracking error signal 11 reaches a predetermined position level after completing the track-jumping operation, or the track-jumping operation can smoothly be terminated by causing the tracking target position signal 42 to smoothly reach the center position level of the track at the moment of terminating the track-jumping operation as shown by the line 423 of FIG. 8.

Even when causing the light spot to jump across a large number of tracks, the tracing control apparatus can also smoothly terminate the track-jumping operation by causing the track target position signal 42 to smoothly move into the center position level of the track in accordance with the number of the tracks subject to the jumping while properly controlling the tracking target position signal generator 33 by means of the microprocessor 31.

The microprocessor 31 may also be composed of a digital signal processor (DSP). Also, the entire tracking control apparatus may even be composed of a DSP or a microprocessor. The present invention does not confine the structure of the microprocessor merely to the one shown in the description of the preferred embodiments.

Figure 10:
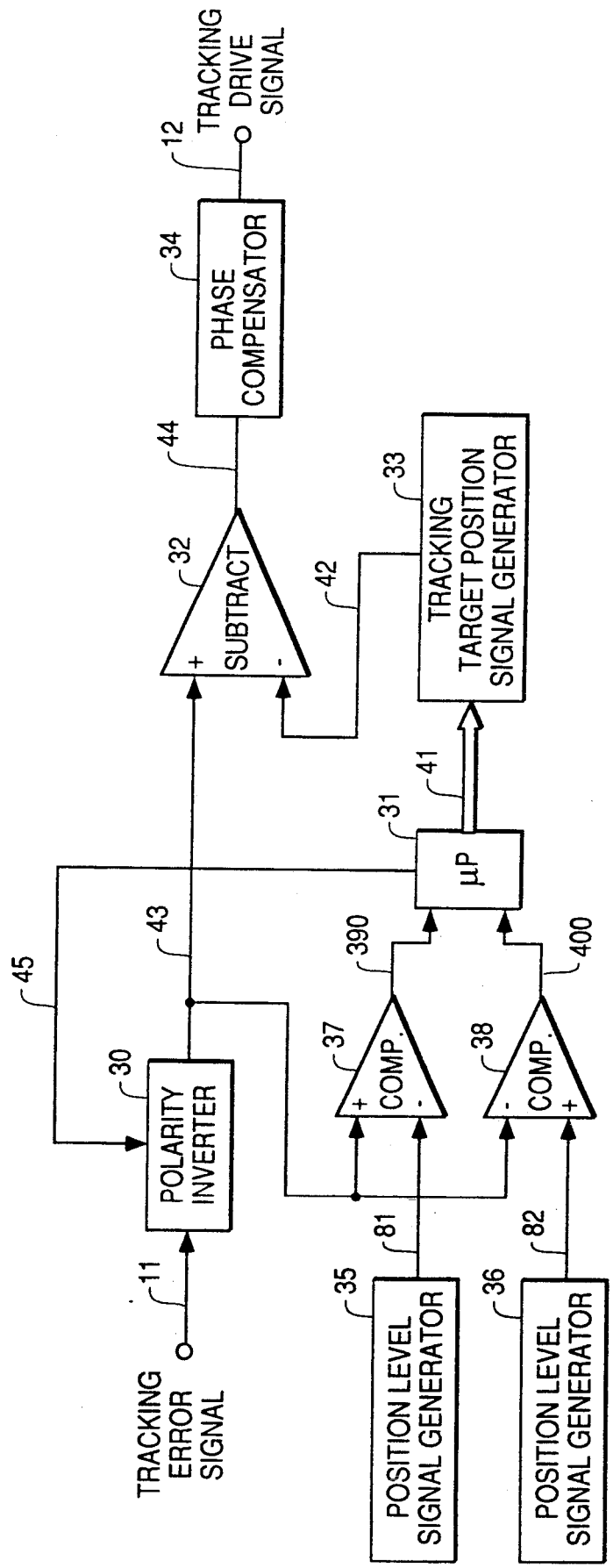
FIG. 10 is a schematic block diagram of a tracking control apparatus in accordance with the second embodiment of the present invention incorporating a microprocessor.

FIG. 10 is a schematic block diagram of a tracking control apparatus incorporating a microprocessor in accordance with a second embodiment of the present invention. The position level signal generator 35 shown in FIG. 10 outputs the position level signal 81. The comparator 37 compares the level of the signal 43 output from the polarity inverter 30 to the position level signal 81 and then outputs the timing signal 390. The position level signal generator 36 output the position level signal 82. the comparator 38 compares the level of the signal 43 output from the polarity inverter 30 to the position level signal 82 and then outputs the timing signal 400. The microprocessor 31 outputs the polarity control signal 45 in response to the timing signal 390 or 400. The polarity inverter 30 inverts the polarity of the tracking error signal 11 acting on the polarity control signal 45 output from the microprocessor 31. The tracking target position signal generator 33 outputs the tracking target position signal 42 in accordance with the tracking target value control signal 41 output fro the microprocessor 31. The subtractor 32 substracts the tracking target position signal 42 from the signal 43 output from the polarity inverter 30, and then outputs the tracking control signal 44. The phase compensator 34 compensates for the phase of the tracking control signal 44 and then outputs the tracking drive signal 12. All the component elements used for the second embodiment are exactly identical to those of the first embodiment.

Figure 11:
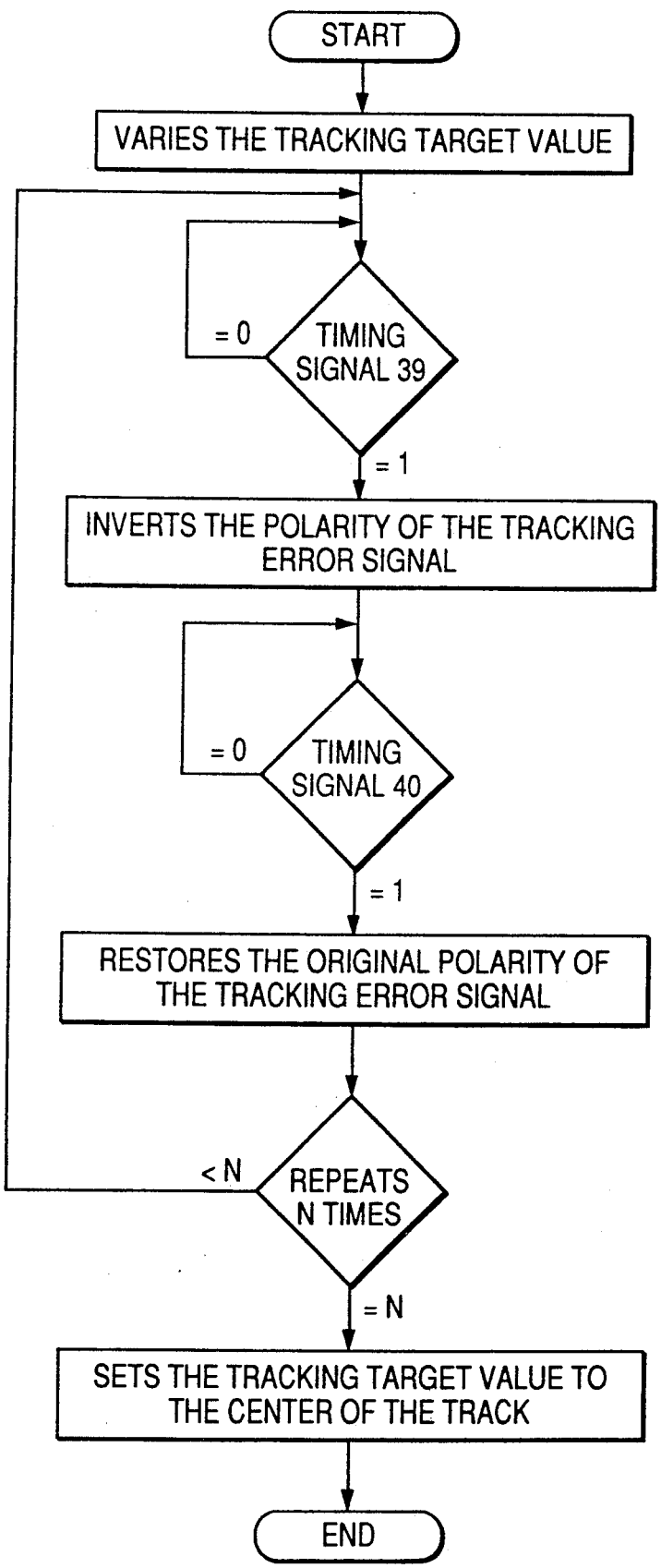
FIG. 11 is a flowchart designating the functional operation of the microprocessor used in the second embodiment of the invention.
Figure 12:
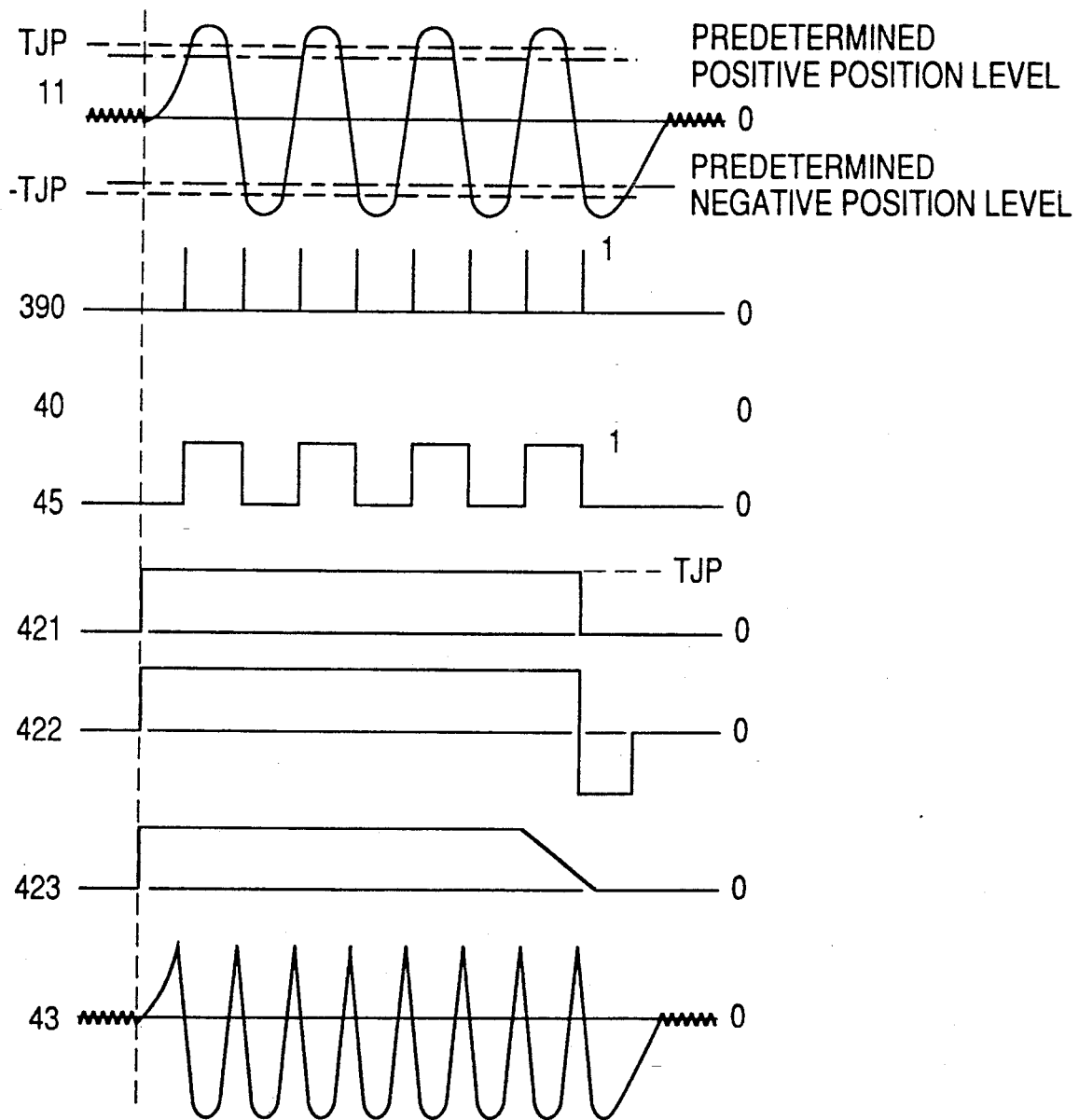
FIG. 12 is a signal waveform chart designating signal waveforms in various locations of the tracking control apparatus in accordance with the second embodiment of the present invention.

Referring now more particularly to FIGS. 11 and 12, the functional operation of the tracking control apparatus in accordance with the second embodiment of the present invention featuring the above structure is described below. FIG. 11 is a flowchart of the data processing operation of the microprocessor used for the second embodiment of the invention. FIG. 12 illustrates the signal waveforms in various locations of the tracking control apparatus in accordance with the second embodiment of the present invention. Assume that the location of the target data recording/reproduction track as the destination of the jumping is still far away by N-tracks. In other words, the number of the data recording/reproduction tracks subject to the track-jumping operation is N. Based on this assumption, the functional operation of the tracking control apparatus when causing the light spot to jump across tracks N=4, i.e., across four tracks in the positive direction, is described below. First, the tracking control apparatus performs the tracking servo operation to cause the light spot to move on along the center of the data recording/reproduction tracks. While this condition is present, the tracking target position signal is at the center position level of the track, in other words, almost at the point 0. First, the microprocessor 31 outputs an instruction to the tracking target position generator 33 in order to transfer the tracking target position signal 42 to the position TJB in the direction of performing the jumping as indicated by the line 421 of FIG. 12. Next, as soon as the tracking error signal 11 exceeds the first position level signal 81, in other words, as soon as the microprocessor 31 detects that the timing signal 390 has varied form 0 to 1, the microprocessor 31 instructs the polarity inverter 30 to invert the polarity of the tracking error signal 11. This causes the light spot to move itself in the direction of the position P2. Next, as soon as the tracking error signal 11 exceeds the position level signal 81, in other words, as soon as the microprocessor 31 detects that the timing signal 390 has varied from 0 to 1, the microprocessor 31 instructs the polarity inverter 30 to restore the original polarity of the tracking error signal 11. This causes the light spot to move itself in the direction of the position P3. By repeatedly executing those sequential processes mentioned above, the light spot sequentially moves to the positions P4, P5, P6, P7 and to P8. As soon as the microprocessor 31 detects that the tracking error signal exceeds the position level signal 81, in other words, when the microprocessor 31 detects eight times that the timing signal 390 has varied from 0 to 1, concretely, when the microprocessor 31 detects two rounds of variations of the timing signals of the performed track-jumping, the microprocessor 31 instructs the polarity inverter 30 to restore the original polarity of the tracking error signal 11, and then, it also instructs the tracking target position signal generator 33 to bring the tracking target position signal 42 back to the value of the center of the track, i.e., back to 0. The tracking control apparatus embodied by the present invention allows the light spot to smoothly jump to the target track while continuously controlling the tracking operation by repeatedly executing those sequential processes mentioned above, for example, across four tracks in this embodiment, thus marking it possible for the tracking control apparatus of the invention to stably perform the track-jumping operation without adversely being affected by external disturbances, such as vibration, for example.

The above description has merely referred to the track-jumping operation across four tracks. However, the tracking control apparatus in accordance with the second embodiment can stably perform the track-jumping operation by the desired number of tracks by executing those sequential processes mentioned above by the number of the track-jumping.

It is also possible for the tracking control apparatus embodied by the invention to perform the track-jumping in the opposite direction by initially inverting the polarity of the tracking target position signal and by replacing the timing signal 390 with the other timing signal 400.

The tracking control apparatus embodied by the present invention can stabilize the termination of the track-jumping operation by restraining excessive movement of the tracking actuator. This can be done by implementing those sequential processes shown below. As shown in FIG. 9, first, the microprocessor 31 instructs the tracking actuator drive signal generator 28, and then causes the adder 29 to add a brake signal (which drives the tracking actuator in the direction opposite from the track-jumping direction) to the tracking drive signal 12 until the predetermined period of time elapses or until the tracking error signal 11 reaches the predetermined position level after completing the track-jumping operation. the tracking actuator drive signal generator 28 has a structure quite similar to that of the tracking target position signal generator 33 shown in FIG. 6.

The tracking control apparatus embodied by the present invention can smoothly terminate the track-jumping operation by implementing the following processes. While causing the microprocessor 31 to control the tracking target position generator 33, as shown in FIG. 8 by the line 422, the tracking control apparatus inverts the tracking target position signal 42 until the predetermined period of time elapses or until the tracking error signal 11 reaches the predetermined position level after completing the track-jumping operation, or the track-jumping operation can smoothly be terminated by causing the tracking target position signal 42 to smoothly accord with the center position level of the track at the moment of terminating the track-jumping operation as shown in FIG. 8 by the line 423.

Even when causing the light spot to jump across a large number of tracks, the tracking control apparatus can also smoothly terminate the track-jumping operation by causing the tracking target position signal 42 to smoothly move into the center position level of the track in accordance with the number of the tracks subject to the jumping while properly controlling the tracking target position signal actuator 33 by means of the microprocessor 31.

The microprocessor 31 may also be composed of a digital signal processor (DSP). Also, the entire tracking control apparatus may even be composed of a DSP or a microprocessor. The invention does not confine the structure and scope of the microprocessor merely to the one shown in the description of the embodiments.

Depending on the optical discs, the shape of the data recording/reproduction track of the optical disc significantly varies. There is such an optical disc which causes the level of the tracking error signal to significantly vary by way of prohibiting the use of the reference value corresponding to the position level set by the tracking control apparatus. If this symptom occurs, it is essential for the tracking control apparatus to lift or lower the level of the tracking error signal to the predetermined value, or lift or lower the levels of the position level signal and the tracking target position signal in accordance with the level of the tracking error signal.

Figure 13:
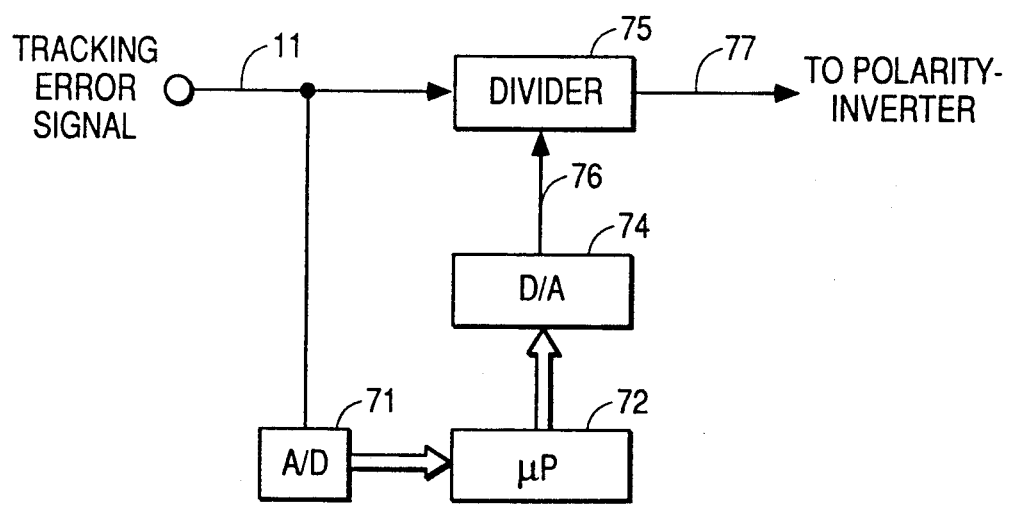
FIG. 13 is a schematic block diagram of an embodiment of a level control means incorporating a microprocessor for regulating the level of the tracking error signal to the predetermined value in accordance with the present invention.

Next, referring to FIG. 13, an embodiment of level control means of the present invention for setting the level of the tracking error signal 11 to the predetermined value by applying a microprocessor is described below. FIG. 13 is a schematic block diagram of an embodiment of level control means for setting the level of the tracking error signal 11 in accordance with the present invention using a microprocessor. The analog-to-digital (A/D) converter 71 shown in FIG. 13 converts the tracking error signal 11 into a digital signal. Element 72 is a microprocessor; element 74 is a digital-to-analog (D/A) converter, and element 75 is a divider which executes division of (the tracking error signal 11) — (the signal 76 output from the D/A converter 74).

Figure 14:
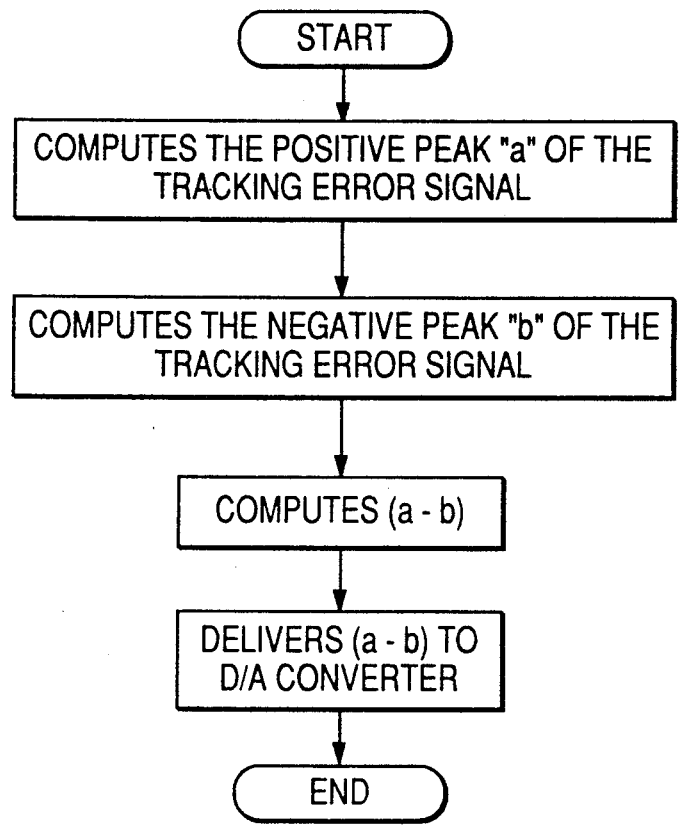
FIG. 14 is a flowchart designating the functional operation of a level control means incorporating a microprocessor for regulating the level of the tracking error signal to the predetermined value in accordance with an embodiment of the present invention.

Referring now to FIG. 14, the functional operation of level control means of the tracking control apparatus of an embodiment of the present invention is described below. FIG. 14 is a flowchart designating the data processing operation of an embodiment of level control means of the invention for setting the level of the tracking error signal to a predetermined value. The tracking error signal 11 is converted into a digital signal by the A/D converter 71. First, the microprocessor 72 reads the digitalized tracking error signal for the predetermined period of time and then finds a maximum value "a". Next, the microprocessor 72 reads the digitalized tracking error signal for the predetermined period of time and then finds a minimal value "b". The microprocessor 72 then subtracts the minimal value "b" from the maximum value "a" to find the level of the tracking error signal, and then outputs the corresponding value to the D/A. converter 74, which then converts this into an analog value. the divider 75 receives the tracking error signal 1 as the divided and also receives the D/A-converted outputs signal 76 as the divisor corresponding to the tracking error signal. As a result, irrespective of the level of the tracking error signal 11, the value of the signal 77 output from the divider 75 remains constant. Because of this, the tracking control apparatus can stably perform the track-jumping operation without causing the value of the position level to contain an error component even when the tracking error signal 11 varies itself.

It is possible for this embodiment to use the microprocessor 31 used for the first and second embodiments in order to replace the above microprocessor 72. Although the above embodiment uses an analog divider, the divider may also be composed of a digital signal processor (DSP) or one using a digital circuit. The invention does not confine the structure and scope of the divider merely to the one shown in the description of the embodiments.

Next, referring now to FIG. 15, an embodiment of means for determining the position level signal and the tracking target position signal in correspondence with the tracking error signal using a microprocessor related tot he invention is described below.

Figure 15:
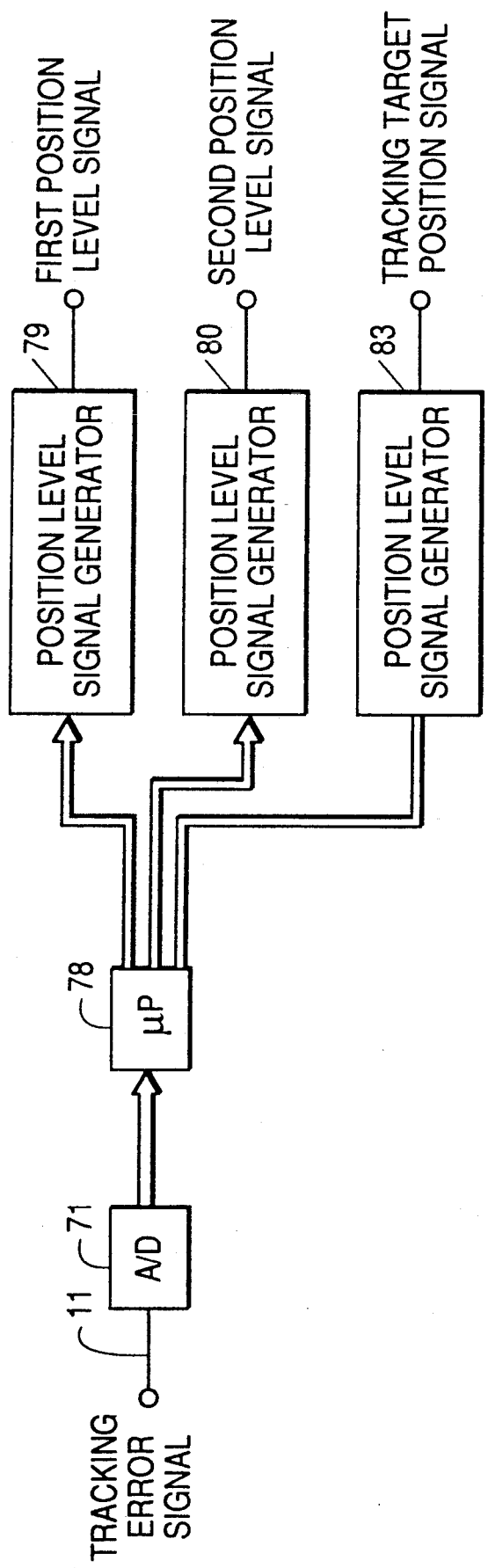
FIG. 15 is a schematic block diagram of an embodiment of a means for determining the position level and the tracking target position incorporating a microprocessor in accordance with the present invention.

FIG. 15 is a schematic block diagram of an embodiment of a means for determining the position level and the tracking target position using a microprocessor in accordance with the present invention. An A/D converter 71 shown in FIG. 15 converts the tracking error signal into a digital signal. The reference numeral 78 designates a microprocessor. A position level signal generator 79 outputs a first position level signal acting on an instruction from the microprocessor 78. A position level signal generator 80 outputs a second position level signal acting on an instruction from the microprocessor 78. A tracking target position signal generator 83 outputs a tracking target position signal acting on an instruction from the microprocessor 78. The position level signal generators 79 and 80 and the tracking target position signal generator 83 may be of the same structure as that of the tracking target position signal generator shown in FIG. 6 or a D/A converter will do for these as a concrete example.

Figure 16:
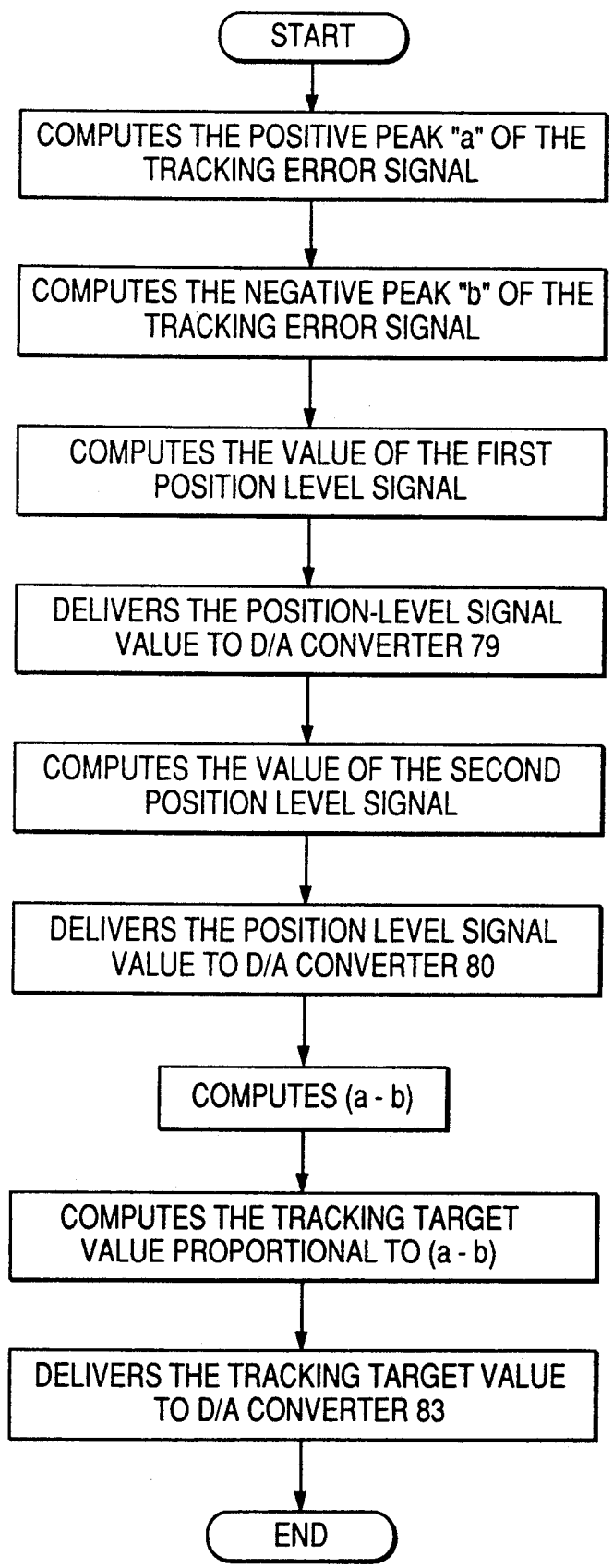
FIG. 16 is a flowchart designating the functional operation of a means for deterring the position level and the tracking target position incorporating a microprocessor in accordance with the present invention.

Referring now to FIG. 16, the functional operation of a means for determining the position level signal and the tracking target position signal in correspondence with the tracking error signal using a microprocessor in accordance with an embodiment of the present invention is described below. FIG. 16 is a flowchart designating the processes of a means for determining the position level and the tracking target position using a microprocessor in accordance with an embodiment of the present invention. The tracking error signal 11 is converted into a digital signal by the A/D converter 71. First, the microprocessor 78 reads the digitalized tracking error signal for a predetermined period of time in order to find a maximum value "a" and then again reads the digitalized tracking error signal for a predetermined period of time to find a minimal value "b", and finally determines the level of the tracking error signal by subtracting the minimal value "b" from the maximum value "a". Next, the microprocessor 798 computes a position level proportional to the tracking error signal level (a-b), and then instructs the position level signal generator 79 to output a first position level signal corresponding to the position level signal 81 shown in FIGS. 3 and 10. Next, the microprocessor 78 computes a position level proportional to the tracking error signal level (a-b), and then instructs the position level signal generator 80 to output a second position level signal corresponding to the position level signal 82 shown in FIGS. 3 and 10. Next, the microprocessor 78 computes the tracking target position proportional to the tracking error signal level (a-b), and then instructs the tracking target position generator 83 to output a tracking target position signal corresponding to the tracking target position signal 42 shown in FIGS. 3 and 10. As a result, the tracking control apparatus can stably perform the track-jumping operation without the presence of even the least error of the position level value even when the tracking error signal varies.

It is possible for this embodiment to use the microprocessor 31 used for the first and second embodiments in order to replace the microprocessor 78. Although the above embodiment uses an analog divider, the divider may also be composed of a digital signal processor (DSP) or one using a digital circuit as well. The invention does not confine the structure and scope of the divider merely to the one shown in the description of the embodiments.

The tracking control signal significantly varies while the track-jumping operation is underway. While this condition is present, the tracking drive signal may saturate as a result of the restrained power voltage. If the tracking drive signal saturates, then the level of the tracking drive signal equivalently lowers to result in the deviation of the characteristic of the tracking control system from the optimal characteristic. To prevent this, the invention causes the characteristic of the phase compensator to vary in correspondence with the lowered level of the tracking drive signal while the track-jumping operation is underway, thus making it possible for the tracking control apparatus to stably perform the track-jumping operation.

Figure 17:
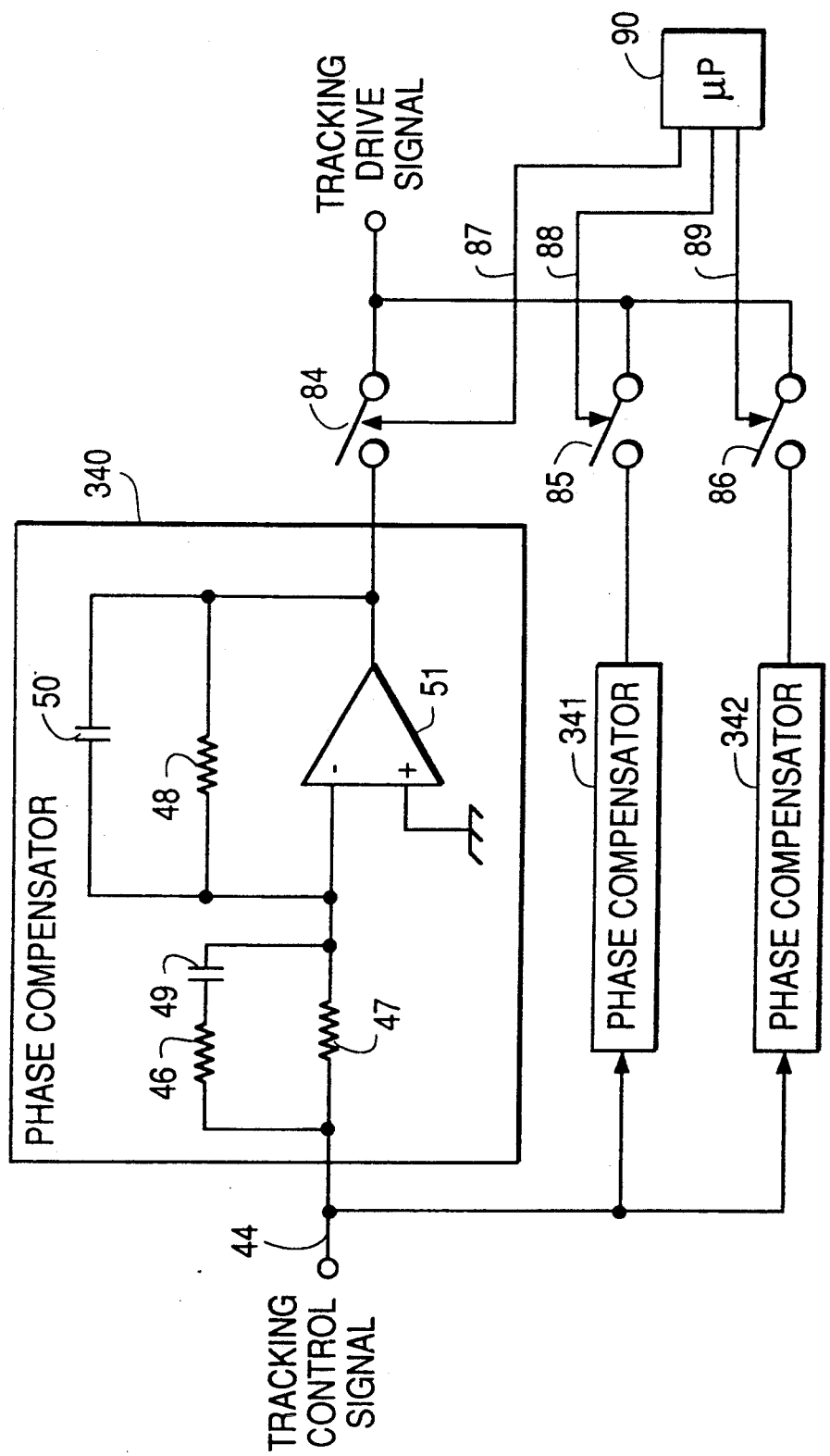
FIG. 17 is a schematic block diagram of an embodiment of a means for switching the phase-compensation frequency or the gain incorporating a microprocessor in accordance with the present invention.

Referring now to FIG. 17, an embodiment of a means for switching the frequency or the gain of the phase compensator during the track-jumping process in accordance with the present invention is described below. FIG. 17 is a schematic block diagram of an embodiment of a means for switching the frequency or the gain of the phase compensator using a microprocessor. This corresponds to the phase compensator 34 shown in FIG. 3 or 10. Element 340 of FIG. 17 is a first phase compensator; element 341 is a second phase compensator, and element 342 is a third phase compensator. Element 84 of FIG. 17 is a first switch; element 85 is a second switch; element 86 is a third switch, and element 90 is a microprocessor. The phase compensator 340 is exactly identical to the phase compensator shown in FIG. 4. These phase compensators 341 and 342 respectively have the circuit structure identical to that of the phase compensator 340. However, since the values of the resistors and capacitors are different from each other, the frequency characteristics are also different from each other.

Figure 19:
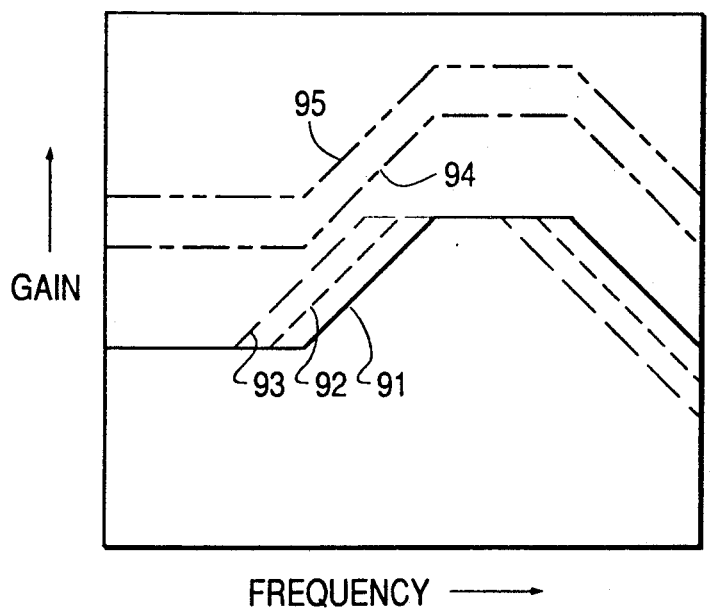
FIG. 19 is a graphic chart designating the frequency characteristic of the phase compensator used for the present invention.
Figure 18:
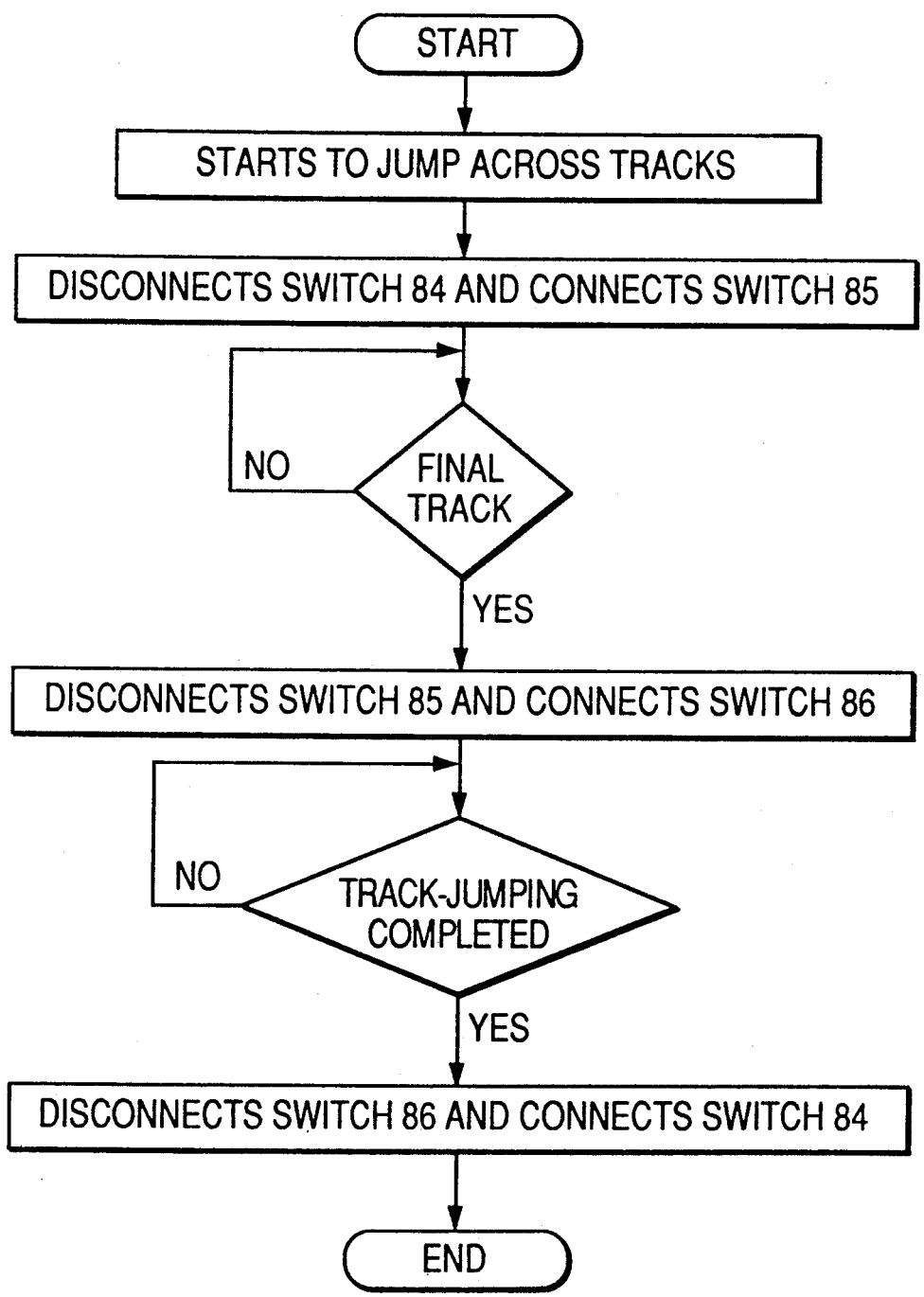
FIG. 18 is a flowchart designating the functional operation of an embodiment of a means for switching the phase-compensation frequency or the gain incorporating a microprocessor in accordance with the present invention.

Next, referring now to FIGS. 18 and 19, an embodiment of a means for switching the frequency or the gain of the phase compensators during the track-jumping operation is described below. FIG. 18 is a flowchart designating the sequential processes of means for switching the frequency or the gain of the phase compensators by means of a microprocessor in accordance with an embodiment of the present invention. FIG. 19 is the graphic presentation of the frequency characteristic of the phase compensators. Assume that the line 91 represents the frequency characteristic of the phase compensator 340, the line 92 represents the frequency characteristic of the phase compensator 341, and the line 93 represents the frequency characteristic of the phase compensator 342. As soon as the tracking control apparatus activates the track-jumping operation, the microprocessor 90 outputs an instruction to connect the switch 86 and disconnect the switches 84 and 85. While the track-jumping operation is underway, the signal level is lowered by the saturated tracking drive signal. To compensate for this, the frequency characteristic of the phase compensators is turned to the lower frequencies. Next, in order to smoothly vary the frequency characteristic in correspondence with the number of tracks subject to the jumping, the switch 85 is connected so that the frequency of the phase compensator 340 can accord with the line 92. Next, after completing the track-jumping operation, the switch 84 is connected in order that the original frequency characteristic can be restored. By executing those sequential processes mentioned above, the tracking control apparatus can properly compensate for the frequency characteristic of the phase compensators subjected to variation by the lowered level of the tracking drive signal caused by the saturation of the tracking drive signal during the track-jumping operation. As a result, the tracking control apparatus can stably perform the track-jumping operation.

The tracking control apparatus can stably perform the track-jumping operation by compensating for the lowered level of the tracking drive signal by increasing the gain of the phase compensators as a result of the saturation of the tracking drive signal during the track-jumping operation by executing the same compensatory processes as was done for the above embodiment by way of according the frequency characteristics of the phase compensators 341 and 342 with the lines 94 and 95, respectively.

The invention also allows the frequency characteristics of the phase compensators to vary by varying the coefficient of the digital filter which is composed of a digital circuit or a digital signal processor (DSP), where the digital filter functions as the phase compensator.

As is clear form the above description, the tracking control apparatus embodied by the present invention is characteristically provided with those structures mentioned above. As a result, it can stably achieve the track-jumping operation without adversely being affected by external disturbance like vibration in that it can continuously and stably perform the track-jumping operation while constantly applying the tracking servo. Furthermore, the tracking control apparatus embodied by the present invention can stably achieve the track-jumping operation without adversely being affected by external disturbances, such a vibration, by effectively switching the frequency characteristics of the phase compensators while the track-jumping operation is underway.

What is claimed is:

1. A tracking control apparatus comprising:

an optical head for emitting a light beam to form a light spot on an optical recording medium on which a plurality of information tracks have been formed and for detecting a reflected light beam from the optical recording medium;

a tracking error detecting means for detecting from the reflected light beam a deviation of the light spot from an information track and for outputting a tracking error signal indicative of said deviation;

a reference signal generating means for generating first and second reference signals which have respective predetermined constant levels opposite in polarity from each other;

a first comparing means for comparing a level of said tracking error signal with said first reference signal and for outputting a first comparison signal indicative of a comparison result thereof;

a second comparing means for comparing a level of said tracking error signal with aid second reference signal and for outputting a second comparison signal indicative of a comparison result thereof;

a tracking target position signal generating means for generating a tracking target position signal indicative of a tracking target position in which the light spot is to be positioned;

a polarity inverting means for inverting a polarity of said tracking error signal;

a subtracting means for subtracting said tracking target position signal from an output signal of said polarity inverting means;

a phase compensating means for compensating a phase of an output signal of said subtracting means to obtain a tracking control signal;

a drive means responsive to said tracking control signal for driving said optical head so as to move the light spot to the tracking target position; and a control means for controlling said tracking target position signal generating means to change said tracking target position signal and being responsive to said first and second comparison signals for controlling said polarity inverting means to perform such a polarity inversion control that inverts the polarity of said tracking error single when an absolute value of the level of said tracking error signal has exceeded an absolute value of the level of said first reference signal and restores the polarity of said tracking error signal when an absolute value of the level of said tracking error signal has exceeded an absolute value of the level of said second reference signal;

wherein said control means first controls said tracking target position signal generating means to change said tracking target position signal to indicate a position shifted in a direction crossing the information tracks from said tracking target position, and then controls said polarity inverting means means to perform the polarity inversion control until the light spot reaches a position on a predetermined target information track, and thereafter controls said target position signal generating means to restore said tracking target position signal to indicate said tracking target position to thereby perform a track-jump operation in which the light spot is moved from an information track to the target information track in the direction crossing the information tracks.

2. An apparatus according to claim 1, wherein said control means controls said tracking target position signal generating means to invert a polarity of said tracking target position signal for a predetermined time period immediately before the light spot reaches the target information track.

3. An apparatus according to claim 1, further comprising a pulse signal adding means controlled by said control means immediately before the light spot reaches the target information track for adding said tracking control signal with a deceleration pulse signal so as to cause said drive means to reverse a direction of driving said optical head for a predetermined time period.

4. An apparatus according to claim 1, further comprising a pulse signal adding means controlled by said control means immediately before the light spot reaches the target information track for adding said tracking control signal with a deceleration pulse signal so as to cause said drive means to reverse a direction of driving said optical head until the light spot reaches a predetermined position.

5. An apparatus according to claim 1, further comprising a means for detecting an amplitude of said tracking error signal, and a means for determining the level of each of said first and second reference signals and an amount of change of said tracking target position signal for the track-jump operation according to a detected amplitude of said tracking error signal.

6. An apparatus according to claim 1, further comprising a means for detecting an amplitude of said tracking error signal, and a gain control means for controlling the amplitude of said tracking error signal according to a detected amplitude of said tracking error signal before performing the track-jump operation.

7. An apparatus according to claim 1, further comprising a means for detecting an amplitude of said tracking error signal, and a phase compensation control means for changing a phase compensation characteristic of said phase compensating means according to a detected amplitude of said tracking error signal during the track-jump operation.

8. An apparatus according to claim 7, wherein said phase compensating means comprises a plurality of phase compensators having different phase compensation characteristics from one another, and wherein said phase compensation control means comprises a selecting means for selecting one of the plurality of phase compensators according to the detected amplitude of said tracking error signal.

9. A tracking control apparatus comprising:
an optical head for emitting a light beam to form a light spot on an optical recording medium on which a plurality of information tracks have been formed and for detecting a reflected light beam from the optical recording medium;
a tracking error detecting means for detecting from the reflected light beam a deviation of the light spot from an information track and for outputting a tracking error signal indicative of said deviation;
a polarity inverting means for inverting a polarity of said tracking error signal;
a reference signal generating means for generating first and second reference signals which have respective predetermined constant levels opposite in polarity from each other;
a first comparing means for comparing a level of an output signal of said polarity inverting means with said first reference signal and for outputting a first comparison signal indicative of a comparison result thereof;
a second comparing means for comparing a level of the output signal of said polarity inverting means with said second reference signal and for outputting a second comparison signal indicative of a comparison result thereof
a tracking target position signal generating means for generating a tracking target position signal indicative of a tracking target position in which the light spot is to be positioned;
a subtracting means for subtracting said tracking target position signal from the output signal of said polarity inverting means;
a phase compensating means for compensating a phase of an output signal of said subtracting means to obtain a tracking control signal;
a drive means responsive to said tracking control signal for driving said optical head so s to move the light spot to the tracking target position; and
a control means for controlling said tracking target position signal generating means to change said tracking target position signal and being responsive to said first and second comparison signals for controlling said polarity inverting means to perform such a polarity inversion control that inverts the polarity of said tracking error signal when an absolute value of the level of the output signal of said polarity inverting means has exceeded an absolute value of the level of said first reference signal and restores the polarity of said tracking error signal when an absolute value of the level of the output signal of said polarity inverting means has exceeded an absolute value of the level of said second reference signal;
with said control means first controls said tracking target position signal generating means to change said tracking target position signal to indicate a position shifted in a direction crossing the information tracks from said tracking target position, and then controls said polarity inverting means means to perform the polarity inversion control until the light spot reaches a position on a predetermined target information track, and thereafter controls said target position signal generating means to restore said tracking target position signal to indicate said tracking target position to thereby perform a track-jump operation in which the light spot is moved from an information track to the target information track in the direction crossing the information tracks.

* * * * *